United States Patent
Yamamoto et al.

(10) Patent No.: US 7,626,906 B2
(45) Date of Patent: Dec. 1, 2009

(54) TILT CONTROL METHOD AND APPARATUS FOR OPTICAL DISC RECORDING AND PLAYBACK APPARATUS

(75) Inventors: Tsuyoshi Yamamoto, Ota (JP); Toshihiko Hiroshima, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 1238 days.

(21) Appl. No.: 10/697,455

(22) Filed: Oct. 30, 2003

(65) Prior Publication Data

US 2004/0114479 A1 Jun. 17, 2004

(30) Foreign Application Priority Data

Dec. 13, 2002 (JP) ............... 2002-362233

(51) Int. Cl.
*G11B 7/09* (2006.01)
(52) U.S. Cl. .................. 369/53.19; 369/44.32
(58) Field of Classification Search .............. 369/44.32, 369/53.19, 53.11, 53.12, 53.13, 53.16, 47.27, 369/47.36
See application file for complete search history.

(56) References Cited

U.S. PATENT DOCUMENTS

| | | | | |
|---|---|---|---|---|
| 5,216,649 A * | 6/1993 | Koike et al. | ............... | 369/44.23 |
| 5,502,698 A * | 3/1996 | Mochizuki | ............... | 369/44.32 |
| 5,805,543 A * | 9/1998 | Takamine et al. | ........ | 369/44.32 |
| 6,418,096 B1 * | 7/2002 | Kahlman et al. | ......... | 369/44.32 |
| 6,430,130 B1 * | 8/2002 | Furukawa | ................ | 369/53.19 |
| 6,434,096 B1 * | 8/2002 | Akagi et al. | ............. | 369/44.32 |
| 6,526,007 B1 * | 2/2003 | Fujita | ...................... | 369/44.32 |
| 6,704,254 B1 * | 3/2004 | Nishiwaki et al. | ........ | 369/44.11 |
| 6,731,699 B2 * | 5/2004 | Pozidis et al. | ............... | 375/340 |
| 7,046,600 B2 * | 5/2006 | Matsumoto | .............. | 369/47.53 |
| 7,050,367 B1 * | 5/2006 | Negishi et al. | ............. | 369/47.1 |
| 7,242,653 B2 * | 7/2007 | Mashimo et al. | ......... | 369/47.52 |
| 2002/0041545 A1 * | 4/2002 | Yamasaki et al. | ........ | 369/44.32 |
| 2002/0060964 A1 * | 5/2002 | Park | ....................... | 369/53.19 |

FOREIGN PATENT DOCUMENTS

| JP | 2001-052362 | 2/2001 |
|---|---|---|
| JP | 2002-197698 | 7/2002 |

* cited by examiner

*Primary Examiner*—Thang V Tran
*Assistant Examiner*—Thomas D Alunkal
(74) *Attorney, Agent, or Firm*—Hogan & Hartson LLP

(57) ABSTRACT

An offset adjustment signal is recorded in a test recording area provided on the inner side of a disc while modifying the level of a driving signal for offset detection that is supplied to a tilt adjustment coil. Thereafter, an operation to play back the offset adjustment signal is performed, and the peak level of an RF signal that is played back is detected. When a signal is recorded for which the detected peak level reaches a maximum, the level of the driving signal supplied to the tilt adjustment coil is set as an offset value. Tilt control is then performed by adding the offset value to a tilt signal for performing tilt control.

12 Claims, 2 Drawing Sheets

TILT CONTROL METHOD AND APPARATUS FOR OPTICAL DISC RECORDING AND PLAYBACK APPARATUS

BACKGROUND OF THE INVENTION

1. Field of the Invention

The present invention relates to an optical disc recording and playback apparatus that is configured so that a signal is recorded to disc by a laser emitted from an optical pickup and the signal recorded on the disc is played back by the laser.

2. Description of the Related Art

Disc players for reading signals that have been recorded on discs using optical pickups have become pervasive. In addition to the playback function, disc recording and playback apparatuses configured so as to enable signals to be recorded onto discs by a laser emitted from an optical pickup have become commercialized.

In an optical disc recording and playback apparatus, it is necessary to accurately aim the laser beam emitted from the optical pickup to a signal track on the disc surface, hence focus control and tracking control operations are performed. The related focus control operation is performed by supplying driving current to a focusing coil for displacing an objective lens toward the disc surface, and the tracking control operation is performed by supplying driving current to a tracking coil for displacing the objective lens in a radial direction on the disc.

Recently, the trend has been to increase the signal density so as to record more signals onto a disc. To increase the density, it is necessary to optimally aim the laser beam onto the disc. To perform this operation, an operation for correcting the relative angle of deviation between the disc and the objective lens, namely, an optical pickup configured so as to allow a tilt adjustment has been developed. (As an example, refer to Japanese Patent Laid-Open Publication No. 2002-197698.) A technique for detecting the tilt of the optical pickup with respect to the disc and for adjusting the tilt has also been developed. (As an example, refer to Japanese Patent Laid-Open Publication No. 2001-52362.)

The technique described in Japanese Patent Laid-Open Publication No. 2001-52362 comprises a tilt sensor for detecting the tilt of an optical pickup with respect to a disc and is configured to perform a tilt adjustment operation on the basis of a signal obtained from the tilt sensor. Although this technique is capable of performing accurate tilt control, the tilt sensor is expensive. This results in a problem where the optical disc recording and playback apparatus becomes expensive.

Furthermore, the tilt adjustment coil that is built into the optical pickup is fixed to a support member for supporting the objective lens. However, deviations in its installed position as well as changes in the ambient temperature, changes in the position of and deterioration from aging of the optical disc recording and playback apparatus result in the tilt angle not being constant while a driving voltage is not supplied to the tilt coil. Therefore, when the tilt adjustment operation is performed in this state, a problem arises in which an accurate tilt adjustment cannot be performed.

SUMMARY OF THE INVENTION

The present invention writes an offset adjustment signal to a disc while modifying a driving signal level to a tilt control coil. Furthermore, the relationship between the driving signal level and the recording position at this time is stored.

An RF signal in the offset adjustment signal that was recorded on the disc is detected next, and either the peak level or the bottom level of the RF signal, or both levels are detected. Then, the driving signal level of the tilt control coil corresponding to (i) the maximum value of the peak level, (ii) the minimum value of the bottom level, or (iii) the maximum value of the difference between the peak level and the bottom level, is detected to become an offset value for tilt control.

The offset value is determined in this manner, and tilt control is performed by adding this offset value to a tilt signal for performing tilt control, then supplying it to a tilt adjustment coil.

Thus, this minimizes the influence from deviation of the installed position of the tilt adjustment coil or from changes in temperature and deterioration from aging, thereby enabling accurate tilt adjustments to be performed.

DETAILED DESCRIPTION OF THE PREFERRED EMBODIMENTS

Figure 1:
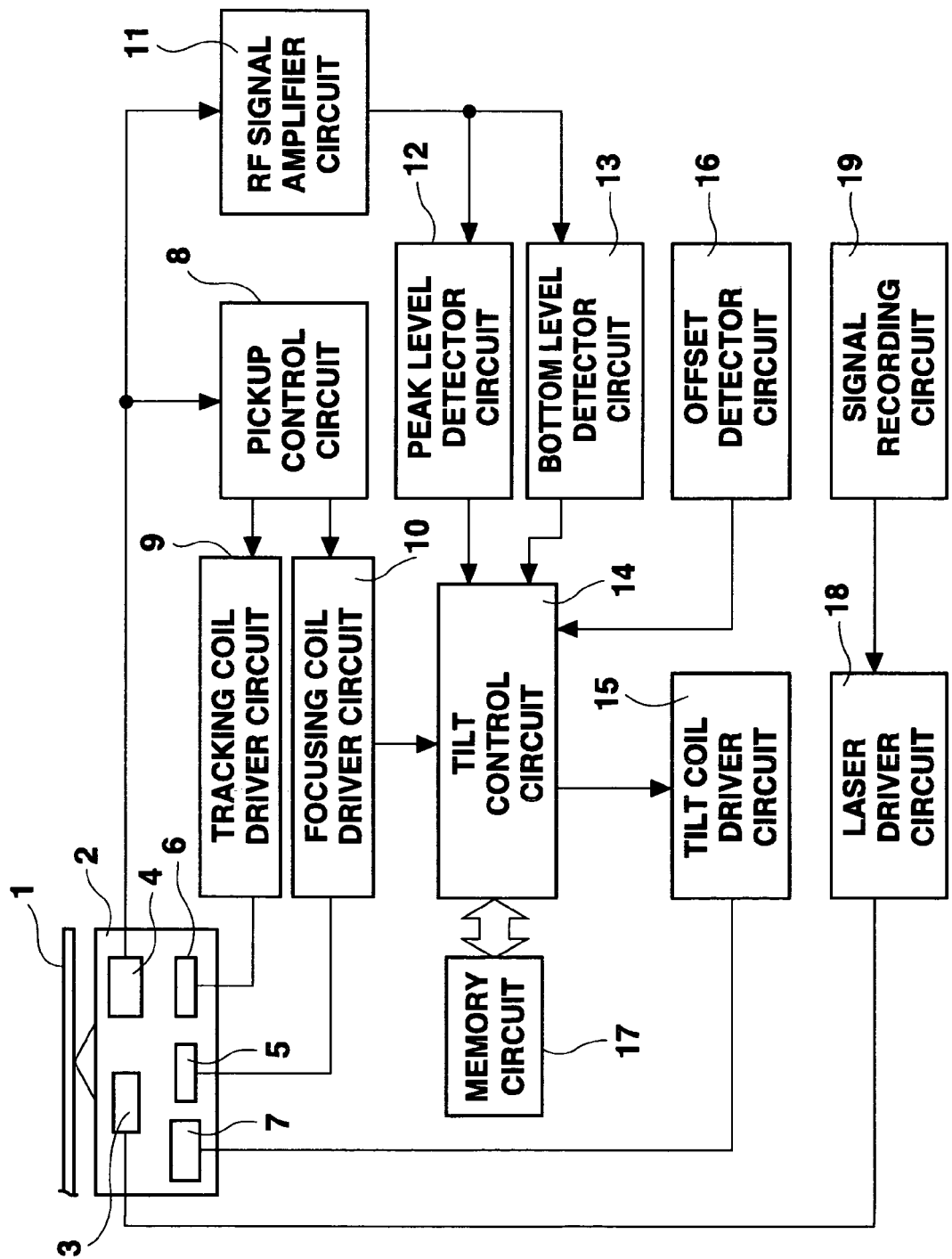
FIG. 1 is a circuit block diagram of an optical disc recording and playback apparatus including a tilt control apparatus relating to an embodiment of the present invention.
Figure 2:
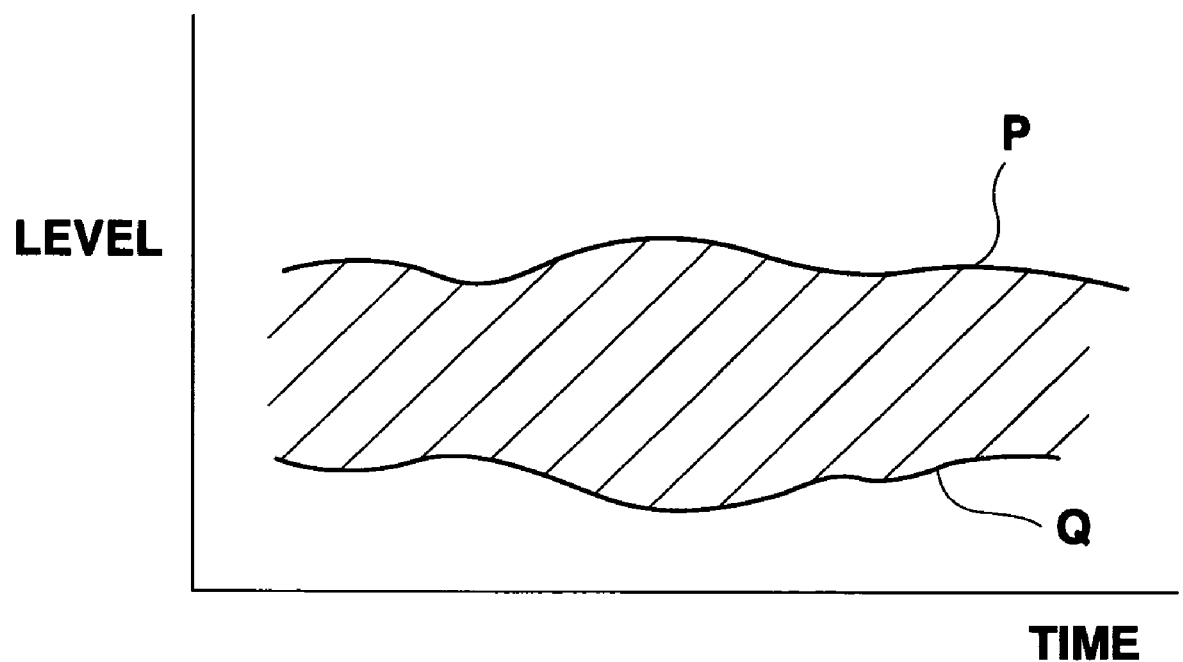
FIG. 2 is a waveform diagram showing a state of a playback RF signal in the offset adjustment signal.

FIG. 1 is a circuit block diagram showing an embodiment of an optical disc recording and playback apparatus relating to the present invention and FIG. 2 is a signal waveform diagram illustrating an operation of the present invention.

In FIG. 1, a disc 1, which is mounted on a turntable (not shown) that is rotationally driven by a spindle motor (not shown), is rotationally driven by the rotation of the turntable, and is provided on the inner side with a test recording area for adjusting the laser output when performing recording operations.

Furthermore, the disc 1 has been recorded with positional information data as a groove called a pregroove. The signal recording and playback operations are performed on the basis of a wobble signal that is obtained from this pregroove. An optical pickup 2 comprising a built-in laser diode 3 for emitting light in the form of a laser beam, a monitor diode (not shown) for monitoring the light emitted from the laser diode, and a photo detector 4 for receiving the light beam that is reflected from the signal surface of the disc 1, is configured so as to move in a radial direction on the disc 1 by a pickup feed motor (not shown).

Furthermore, the optical pickup 2 comprises a built-in focusing coil 5 for displacing an objective lens (not shown) toward the disc surface, a tracking coil 6 for displacing the objective lens in a radial direction on the disc 1, and a tilt adjustment coil 7 for adjusting the angle of the objective lens with respect to the disc 1.

A pickup control circuit 8 performs a focusing control operation for focusing the light beam from the optical pickup 2 onto the signal surface of the disc 1 on the basis of a signal obtained from the photo detector 4 that is built into the optical pickup 2 and a tracking control operation causing the light beam to track a signal track on the signal surface, and is configured so as to output a tracking control signal in accordance with a tracking error signal and a focusing control signal in accordance with a focus error signal.

A tracking coil driver circuit 9 inputs the tracking control signal that is output from the pickup control circuit 8 and is configured so as to supply a driving signal to the tracking coil 6 that is built into the optical pickup 2. A focusing coil driver circuit 10 inputs the focusing control signal that is output from the pickup control circuit 8 and is configured so as to supply a driving signal to the focusing coil 5 that is built into the optical pickup 2.

An RF signal amplifier circuit 11 inputs and amplifies an RF signal obtained from the photo detector 4 that is built into the optical pickup 2 and is configured so as to output an RF signal having a waveform shown in FIG. 2. A peak level detector circuit 12 inputs the RF signal that is output from the RF signal amplifier circuit 11 and functions to detect a level, namely, the peak level, denoted by the upper solid line P in the waveform diagram shown in FIG. 2. A bottom level detector circuit 13 inputs the RF signal that is output from the RF signal amplifier circuit 11 and functions to detect a level, namely, the bottom level, denoted by the lower solid line Q in the waveform diagram shown in FIG. 2.

A tilt control circuit 14 for inputting values of the peak level and the bottom level obtained from the signal, namely, the RF signal, that is detected and output by the peak level detector circuit 12 and the bottom level detector circuit 13 and performing a tilt control operation on the basis of a tilt adjustment signal obtained from the driving signal that is output from the focusing coil driver circuit 10, and a tilt coil driver circuit 15 having its operation controlled according to the signal that is output from the tilt control circuit 14 are connected so as to supply a driving signal for tilt adjustment to the tilt adjustment coil 7 that is built into the optical pickup 2.

An offset detector circuit 16 enters an operating state during offset detection that is performed prior to the recording operation and is configured so that a control signal is output from the tilt control circuit 14 to the tilt coil driver circuit 15 to cause a driving signal for modifying the tilt in a stepwise manner to be output to the tilt coil 7. A memory circuit 17 stores the offset value detected by the offset detection operation to be described hereinafter and includes a function to output an offset signal to be added to the tilt adjustment signal obtained from the focusing coil driver circuit 10 when the tilt control operation is performed in the recording and playback operation states.

A laser driver circuit 18 for supplying a driving current to the laser diode 3 that is built into the optical pickup 2, and a signal recording circuit 19 for encoding the recording signal into a signal for recording and supplying it to the laser driver circuit 18 are configured so as to output the offset adjustment signal during offset detection.

The optical disc recording and playback apparatus relating to the present invention is configured as described above and its operation is described next. In a state where an ordinary recording operation or playback operation is being performed, a focus error signal and a tracking error signal are generated from the signal obtained from the photo detector 4 that is built into the optical pickup 2, and control operations for focusing control and tracking control are performed by the pickup control circuit 8 on the basis of the error signals.

When the control operations are performed for the various operations by the pickup control circuit 8, control signals are output from the pickup control circuit 8 to the focusing coil driver circuit 10 and the tracking coil driver circuit 9. As a result, driving currents are supplied from the focusing coil driver circuit 10 and the tracking coil driver circuit 9 to the focusing coil 5 and the tracking coil 6. These operations enable the light beam emitted from the optical pickup 2 to be focused onto the signal surface of the disc 1 by the focusing control operation and to track the signal tracks by the tracking control operation.

The focusing control operation and the tracking control operation by the pickup control circuit 8 are performed as described above. The tilt control method, a major idea of the present invention, is described next.

In the optical disc recording and playback apparatus relating to the present embodiment, an operation is performed to set an offset value required for accurately performing them tilt control operation prior to performing the recording operation. In this setting operation, a signal for performing the operation to set the offset value is first output from the offset detector circuit 16 to the tilt control circuit 14.

In accordance with this signal, the tilt control circuit 14 records an offset adjustment signal in the test recording area on the disc 1. In this operation, in a state where the normal tilt control operation is not performed (state where the normal tilt control signal=0), a control operation is performed so that a signal for modifying the tilt angle a step at a time is output in a stepwise manner from the tilt coil driver circuit 15 to the tilt coil 7. It is preferable to set the modification range slightly larger than the estimated range in which offsets are likely to occur. Furthermore, although it is preferable to perform the modification in steps, it may also be performed continuously.

First, when the control signal is output from the tilt control circuit 14, a driving signal is supplied from the tilt coil driver circuit 15 to the tilt adjustment coil 7 so as to modify the tilt of the objective lens in one direction by one step. As a result, the objective lens is tilted by one step in the direction of the tilt adjustment by the driving operation of the tilt adjustment coil 7. The tilt control circuit 14 sequentially outputs control signals according to a predetermined method, and as a result, the tilt of the objective lens is sequentially modified within a predetermined range.

During the operation for offset detection, an operation is performed to modify the tilt of the objective lens one step at a time by the signal that is output from the offset detector circuit 16. This operation is performed while recording the offset adjustment signal in the test recording area that is provided on the inner side of the disc 1. Namely, the offset adjustment signal is output from the signal recording circuit 19 to the laser driver circuit 18, and the signal is recorded in the test recording area of the disc 1 by the laser beam that is output from the laser diode 3. When this recording operation is performed, the relationship between the recording position and the level of the signal that is output from the offset signal detector circuit 16 is stored, such as into the memory circuit 17. Namely, by sequentially modifying the tilt of the objective lens while emitting the laser beam, the offset adjustment signal is written to the test recording area and the relationship between the recording position and the tilt of the objective lens is stored into the memory circuit 17.

After the completion of the operation to modify the tilt of the objective lens on the basis of the signal that is output from the offset detector circuit 16, an operation is performed to play back the offset adjustment signal that was recorded on the disc 1. This signal playback operation moves the position of the optical pickup 2 to the start position for the recording operation of the offset adjustment signal and is performed without the driving signal being supplied to the tilt adjustment coil 7 and with the objective lens at a intermediate position.

When the playback operation is performed for the recorded offset adjustment signal while modifying the angle of the objective lens with respect to the disc 1, the level of the RF signal, which is obtained from the reflection off the disc 1, changes. The offset adjustment signal that was recorded in the test recording area on the disc 1 is amplified by the RF signal amplifier circuit 11, and is then input by the peak level detector circuit 12 and the bottom level detector circuit 13.

As the tilt of the optical pickup 2 with respect to the signal surface of the disc 1 is adjusted in the correct direction, the peak level in the RF signal increases while the bottom level decreases. Thus, when the signal, which was recorded while the angle of the tilt was modified in steps, is played back, the peak level reaches a maximum then decreases while the bottom level reaches a minimum then increases.

When the offset adjustment signal is recorded while the objective lens is tilted in steps in the direction of the tilt adjustment by the driving operation of the tilt adjustment coil 7, the peak level and the bottom level of the RF signal, which is the playback signal, vary. Thus, when the driving voltage is supplied to the tilt coil 7 at the recording position of the offset adjustment signal where the peak level reaches a maximum or at the recording position of the offset adjustment signal where the bottom level reaches a minimum, an operation is performed to store the value of the control signal, which is output from the tilt control circuit 14, into the memory circuit 17 as the offset value.

The above-mentioned operation to set the offset value utilizes the peak level of the RF signal reaching a maximum and the bottom level reaching a minimum. However, the difference between the peak level and the bottom level of the RF signal may also be utilized. Namely, the difference between the peak level and the bottom level is at a characteristic maximum when a signal that was recorded on the signal surface of the disc 1 with the tilt of the objective lens in an optimum state is played back. Thus, when the driving voltage is supplied to the tilt coil 7 at a position where the offset adjustment signal is recorded with the difference reaching a maximum, an operation is performed to store the value of the control signal, which is output from the tilt control circuit 14, into the memory circuit 17 as the offset value.

The offset value is stored into the memory circuit 17 as described above. The tilt adjustment operation is described next.

When the optical disc recording and playback apparatus is in the playback state or recording state, and the relationship between the optical pickup 2 and the disc 1 is in a state requiring tilt adjustment to be performed, the driving signal for modifying the tilt of the objective lens is supplied to the tilt adjustment coil 7. The tilt adjustment signal for modifying the tilt utilizes the driving signal that is supplied to the focusing coil 5. The driving signal that is supplied from the focusing coil driver circuit 10 to the focusing coil 5 is a DC voltage signal superimposed with an AC signal. Namely, the DC voltage is a signal for placing the objective lens at an operating position and the AC signal is for displacing the objective lens by tracking the fast movements of the disc 1. The above-mentioned DC voltage is for displacing the objective lens to an operating position in accordance with the positional relationship between the signal surface of the disc 1 and the optical pickup 2, and the tilt adjustment can be performed by utilizing the change in this DC voltage.

A change component of the DC voltage included in the driving signal that is output from the focusing coil driver circuit 10 to the focusing coil 5 is extracted as the tilt adjustment signal. To the extracted signal is added the offset value stored in the memory circuit 17, and this signal is supplied as a tilt control signal to the tilt coil driver circuit 15. As a result of this operation, the driving signal for tilt adjustment is supplied from the tilt coil driver circuit 15 to the tilt adjustment coil 7 so that an operation to adjust the angle of the optical pickup 2 to an optimum state with respect to the disc 1, namely, the tilt adjustment operation, is accurately performed.

In the present embodiment, the tilt adjustment signal was obtained from the driving signal supplied to the focusing coil 5. However, an apparatus may also be configured so as to perform tilt adjustment by utilizing the changes in the level of the RF signal.

While there has been described what are at present considered to be preferred embodiments of the invention, it will be understood that various modifications may be made thereto, and it is intended that the appended claims cover all such modifications as fall within the true spirit and scope of the invention.

What is clamed is:

1. A tilt control method in an optical pickup including a tilt adjustment coil for adjusting the tilt of an objective lens, comprising the steps of:
   recording an offset adjustment signal in a test recording area provided on an optical disc,
   wherein said offset adjustment signal is recorded while modifying a driving signal level supplied to said tilt adjustment coil;
   thereafter playing back an RF signal of said offset adjustment signal that was recorded on the optical disc;
   detecting the peak level in the RF signal of said offset adjustment signal that was played back; and
   setting said driving signal level, when the detected peak level reaches a maximum, as an offset value for the driving signal to be supplied to the tilt adjustment coil;
   wherein the tilt angle of the optical pickup is changed by changing the level of the drive current supplied to the tilt adjustment coil.

2. A tilt control method according to claim 1, wherein:
   the tilt control is performed by adding the set offset value to a tilt signal for performing tilt control and supplying the added signal to said tilt adjustment coil.

3. A tilt control method in an optical pickup including a tilt adjustment coil for adjusting the tilt of an objective lens, comprising the steps of:
   recording an offset adjustment signal in a test recording area provided on an optical disc,
   wherein said offset adjustment signal is recorded while modifying a driving signal level supplied to said tilt adjustment coil;
   thereafter playing back an RF signal of said offset adjustment signal that was recorded on the optical disc;
   detecting the bottom level in the RF signal of said offset adjustment signal that was played back; and
   setting said driving signal level, when the detected bottom level reaches a minimum, as an offset value for the driving signal to be supplied to the tilt adjustment coil;
   wherein the tilt angle of the optical pickup is changed by changing the level of the drive current supplied to the tilt adjustment coil.

4. A tilt control method according to claim 3, wherein:
   the tilt control is performed by adding the set offset value to a tilt signal for performing tilt control and supplying the added signal to said tilt adjustment coil.

5. A tilt control method in an optical pickup including a tilt adjustment coil for adjusting the tilt of an objective lens, comprising the steps of:
   recording an offset adjustment signal in a test recording area provided on an optical disc,
   wherein said offset adjustment signal is recorded while modifying a driving signal level supplied to said tilt adjustment coil;
   thereafter playing back an RF signal of said offset adjustment signal that was recorded on the optical disc;

detecting the peak level and the bottom level in the RF signal of said offset adjustment signal that was played back; and setting said driving signal level, when the difference between the detected peak level and bottom level reaches a maximum, as an offset value for the driving signal to be supplied to the tilt adjustment coil;

wherein the tilt angle of the optical pickup is changed by changing the level of the drive current supplied to the tilt adjustment coil.

6. A tilt control method according to claim 5, wherein:
the tilt control is performed by adding the set offset value to a tilt signal for performing tilt control and supplying the added signal to said tilt adjustment coil.

7. A tilt control apparatus for adjusting the tilt of an objective lens in an optical pickup comprising:
a signal recording circuit for recording a signal by irradiating light onto a disc via said objective lens;
a photo detector circuit for obtaining an RF signal by detecting reflected light from the disc via said objective lens;
a peak level detector circuit for detecting the peak level of the RF signal from said photo detector circuit;
a tilt adjustment coil for controlling the tilt of said objective lens; and
a tilt control circuit for controlling the driving signal level supplied to said tilt adjustment coil;
an offset adjustment signal is written to the disc by recording a signal to the disc by said signal recording circuit while said tilt control circuit modifies the driving signal level to the tilt control coil, and the relationship between driving signal level and recording position is stored;
said photo detector circuit detects an RF signal of the offset adjustment signal that was recorded on the disc;
the peak level detector circuit detects the peak level of the RF signal in said offset adjustment signal; and
the tilt control circuit detects the driving signal level of the tilt control coil corresponding to the maximum of the detected peak level and uses the detected driving signal level as an offset value for tilt control;
wherein the tilt angle of the optical pickup is changed by changing the level of the drive current supplied to the tilt adjustment coil.

8. A tilt control apparatus according to claim 7, wherein:
said tilt control circuit performs tilt control by adding said offset value to a tilt signal for performing tilt control and supplying this to said tilt adjustment coil.

9. A tilt control apparatus for adjusting the tilt of an objective lens in an optical pickup comprising:
a signal recording circuit for recording a signal by irradiating light onto a disc via said objective lens;
a photo detector circuit for obtaining an RF signal by detecting reflected light from the disc via said objective lens;
a bottom level detector circuit for detecting the bottom level of the RF signal from said photo detector circuit;
a tilt adjustment coil for controlling the tilt of said objective lens; and
a tilt control circuit for controlling the driving signal level supplied to said tilt adjustment coil;

an offset adjustment signal is written to the disc by recording a signal to the disc by said signal recording circuit while said tilt control circuit modifies the driving signal level to the tilt control coil, and the relationship between driving signal level and recording position is stored;
said photo detector circuit detects an RF signal of the offset adjustment signal that was recorded on the disc;
the bottom level detector circuit detects the bottom level of the RF signal in said offset adjustment signal; and
the tilt control circuit detects the driving signal level of the tilt control coil corresponding to the minimum of the detected bottom level and uses the detected driving signal level as an offset value for tilt control;
wherein the tilt angle of the optical pickup is changed by changing the level of the drive current supplied to the tilt adjustment coil.

10. A tilt control apparatus according to claim 9, wherein:
said tilt control circuit performs tilt control by adding said offset value to a tilt signal for performing tilt control and supplying this to said tilt adjustment coil.

11. A tilt control apparatus for adjusting the tilt of an objective lens in an optical pickup comprising:
a signal recording circuit for recording a signal by irradiating light onto a disc via said objective lens;
a photo detector circuit for obtaining an RF signal by detecting reflected light from the disc via said objective lens;
a peak level detector circuit for detecting the peak level of the RF signal from said photo detector circuit;
a bottom level detector circuit for detecting the bottom level of the RF signal from said photo detector circuit;
a tilt adjustment coil for controlling the tilt of said objective lens; and
a tilt control circuit for controlling the driving signal level supplied to said tilt adjustment coil;
an offset adjustment signal is written to the disc by recording a signal to the disc by said signal recording circuit while said tilt control circuit modifies the driving signal level to the tilt control coil, and the relationship between driving signal level and recording position is stored;
said photo detector circuit detects an RF signal of the offset adjustment signal that was recorded on the disc;
said peak level detector circuit detects the peak level of the RF signal in said offset adjustment signal;
said bottom level detector circuit detects the bottom level of the RF signal in said offset adjustment signal; and
the tilt control circuit detects the driving signal level of the tilt control coil corresponding to the maximum of the difference between the detected peak level and bottom level and uses the detected driving signal level as an offset value for tilt control;
wherein the tilt angle of the optical pickup is changed by changing the level of the drive current supplied to the tilt adjustment coil.

12. A tilt control apparatus according to claim 11, wherein:
said tilt control circuit performs tilt control by adding said offset value to a tilt signal for performing tilt control and supplying this to said tilt adjustment coil.

* * * * *